(12) United States Patent
Koizumi

(10) Patent No.: US 10,875,791 B2
(45) Date of Patent: Dec. 29, 2020

(54) FUNCTIONAL WATER PRODUCTION DEVICE

(71) Applicant: NIHON TRIM CO., LTD., Osaka (JP)

(72) Inventor: Yoshinobu Koizumi, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 0 days.

(21) Appl. No.: 16/302,721

(22) PCT Filed: May 18, 2017

(86) PCT No.: PCT/JP2017/018623
§ 371 (c)(1),
(2) Date: Nov. 19, 2018

(87) PCT Pub. No.: WO2017/204069
PCT Pub. Date: Nov. 30, 2017

(65) Prior Publication Data
US 2019/0202718 A1    Jul. 4, 2019

(30) Foreign Application Priority Data
May 25, 2016 (JP) .................................. 2016-104381

(51) Int. Cl.
*C02F 1/66* (2006.01)
*C02F 1/461* (2006.01)

(52) U.S. Cl.
CPC .... *C02F 1/4618* (2013.01); *C02F 2201/4614* (2013.01); *C02F 2201/46115* (2013.01);
(Continued)

(58) Field of Classification Search
CPC ........... C25B 15/02; C25B 15/08; C25B 1/04; C25B 9/08; C25B 3/04; C25B 9/00; C25B 9/18; C25B 9/04; C25B 9/12; C25B 9/206
See application file for complete search history.

(56) References Cited

FOREIGN PATENT DOCUMENTS

JP    H07-190989 A    7/1995
JP    H08-158085 A    6/1996
(Continued)

OTHER PUBLICATIONS

Trim Ion Gracia Toriatsukai Setsumeisho, (Mar. 15, 2016), p. 12, 13, 16, 17, URL: http://www. nihon-trim.co.jp/products/pdf/how gracia.pdf, (retrieved on Nov. 16, 2018) [X] 1-2 [Y] 3-5 (cited in the ISR of PCT/JP2017/018623, concise explanation of the relevancy be found in a copy of the ISR filed herewith).

*Primary Examiner* — Zulmariam Mendez
(74) *Attorney, Agent, or Firm* — Muncy, Geissler, Olds & Lowe, P.C.

(57) ABSTRACT

A functional water production device 1 comprises: a functional water production unit 2 for producing functional water including purified water, reduced water or acidic water obtained by electrolysis of water; a control unit 6 for controlling the functional water production unit 2 in a plurality of operational modes including a water purification mode, a reduced water mode, and an acidic water mode; and an operation unit 7 for switching the operational modes. The operation unit 7 comprises: an operational surface (71a); a display unit 72 for displaying operational areas 103, 104, and 105 corresponding to the operational modes along a first coordinate axis 101 in an order of pH of the functional water to be produced; and a position detecting unit 73 for detecting a position of the touch by a user on the operational surface (71a). Based on the information of the position, the control unit 6 determines the operational mode, and produces water according to the operational mode.

14 Claims, 8 Drawing Sheets

(52) U.S. Cl.
CPC .............. *C02F 2201/46135* (2013.01); *C02F 2201/46145* (2013.01); *C02F 2209/06* (2013.01)

(56) References Cited

FOREIGN PATENT DOCUMENTS

| | | |
|---|---|---|
| JP | H09-299953 A | 11/1997 |
| JP | H11-192484 A | 7/1999 |
| JP | 2002-066561 A | 3/2002 |
| JP | 2005-144335 A | 6/2005 |
| JP | 2006-035107 A | 2/2006 |
| JP | 2006-223940 A | 8/2006 |
| JP | 2008-253943 A | 10/2008 |
| JP | 2011-247008 A | 12/2011 |
| JP | 2013138996 A | 7/2013 |

FUNCTIONAL WATER PRODUCTION DEVICE

TECHNICAL FIELD

The present invention relates to a functional water production device for producing functional water including purified water, reduced water or acidic water.

BACKGROUND ART

Alkaline reduced water obtained by electrolyzing water is attracting attention as it is effective for improving gastrointestinal symptoms. In recent years, the reduced water produced by electrolysis is also called electrolytic hydrogen water because hydrogen gas is dissolved therein, is expected to be effective in reducing oxidative stress, etc., and attracts more attention.

Functional water production devices for household use that make it easy to take water, such as reduced water, having a special function (hereinafter referred to as functional water) in everyday life have been widely used.

For example, Patent Literature 1 has disclosed a functional water production device that produces the reduced water or the acidic water obtained by electrolyzing purified water or water. When the user selects a purpose of use, the functional water production device produces water having a pH corresponding to the selected purpose of use. For example, when the user selects "for daily drinking" as a purpose of use, the functional water production device produces the reduced water of pH 9.5.

However, even when the user selects "for daily drinking", the user may want to drink the reduced water having a pH slightly higher (for example, pH 9.6) or lower (for example, pH 8.9) than normal. However, in the functional water production devices described above, the pH of the produced water is determined according to the purpose of use, therefore, the user cannot instruct the production of water having the desired pH. For the acidic water, the pH is determined according to the purpose of use as well, therefore, there is the same problem.

Further, the water that can be produced by the functional water production devices has a higher pH in the order of the acidic water, the purified water, and the reduced water due to properties of the devices. However, in the functional water production device disclosed in the Patent Literature 1, operational areas corresponding to the acidic water, the purified water, and the reduced water are not arranged in order of pH, therefore, the user cannot intuitively understand high or low of pH when operating the device. Thereby, it is difficult to intuitively recognize the type of desired functional water and the operational areas corresponding to the value of pH of the desired functional water, therefore, there is a demand for improvement in usability.

On the other hand, Patent Literature 2 has disclosed a faucet operating device capable of adjusting a flow rate and temperature of discharged water by using fractionation regions (operational areas) fractionated by lattice-shaped mark lines. The flow rate and the temperature are items that can be adjusted independently of each other, therefore, the operating device is configured so that two kinds of adjustments can be performed at the same time by arranging corresponding operation regions on two coordinate axes.

However, in the functional water production device, the type and the pH of the functional water produced are related to each other as described above, therefore, when the type of functional water is assigned to one coordinate axis and the pH is assigned to the other coordinate axis, it is difficult to arrange the operational areas correctly and so that the user can intuitively recognize it, thereby, it is possible that the user is confused.

CITATION LIST

Patent Literature

Patent Literature 1: Japanese Unexamined Patent Application Publication No. 2005-144335
Patent Literature 2: Japanese unexamined Patent Application Publication No. 2011-247008

SUMMARY OF THE INVENTION

Problems to be Solved by the Invention

The present invention was made in view of the above, and a primary object thereof is to provide a functional water production device capable of allowing the user to simply and intuitively select desired functional water and its pH by a single touch operation from functional water that can be produced.

Means for Solving the Problem

In one aspect of the present invention, a functional water production device comprises: a functional water production unit for producing functional water including purified water, reduced water or acidic water; a control unit for controlling the functional water production unit in a plurality of operational modes including a water purification mode for producing the purified water, a reduced water mode for producing the reduced water, and an acidic water mode for producing the acidic water; and an operation unit for switching the operational modes, wherein the operation unit comprises: an operational surface to be touched by a user for operation; a display unit for displaying operational areas respectively corresponding to the operational modes along a first coordinate axis on the operational surface in an order of pH of the functional water to be produced; and a position detecting unit for detecting a position of the touch for operation on the operational surface by the user and outputting information of the position to the control unit, and the control unit determines the operational mode and the pH of the functional water to be produced in the determined operational mode based on the information of the position and controls the functional water production unit.

In another aspect of the invention, it is preferred that the display unit displays the pH of the functional water by shades of color.

In another aspect of the invention, it is preferred that the functional water production unit includes an electrolytic cell having a first electrode chamber and a second electrode chamber divided by a solid polymer membrane.

In another aspect of the invention, it is preferred that the control unit determines dissolved gas concentration of the functional water based on the information of the position and controls the functional water production unit.

In another aspect of the invention, it is preferred that the display unit displays the dissolved gas concentration on a second coordinate axis on the operational surface.

Advantageous Effects of the Invention

In the functional water production device of the present invention, the operation unit comprises the operational surface to be touched by the user for operation, the display unit for displaying the operational areas respectively corresponding to the operational modes, and the position detecting unit for detecting the position of the touch for the operation on the operational surface by the user and outputting the information of the position to the control unit. And the control unit determines the operational mode and the pH of the functional water to be produced in the determined operational mode based on the information of the position and controls the functional water production unit. Thereby, the user can simply select the desired functional water and its pH by a single touch operation from the functional water that can be produced.

Further, the display unit displays the operational areas respectively corresponding to the operational modes along the first coordinate axis on the operational surface in the order of the pH of the functional water to be produced. Thereby, the user can intuitively perceive the functional water and its pH according to the arrangement order, therefore, it is possible that the user intuitively selects the desired functional water and the desired pH of the water, thereby, the usability of the functional water production device is improved.

DESCRIPTION OF THE PREFERRED EMBODIMENT

An embodiment of the present invention will now be described in detail below in conjunction with accompanying drawings.

Figure 1:
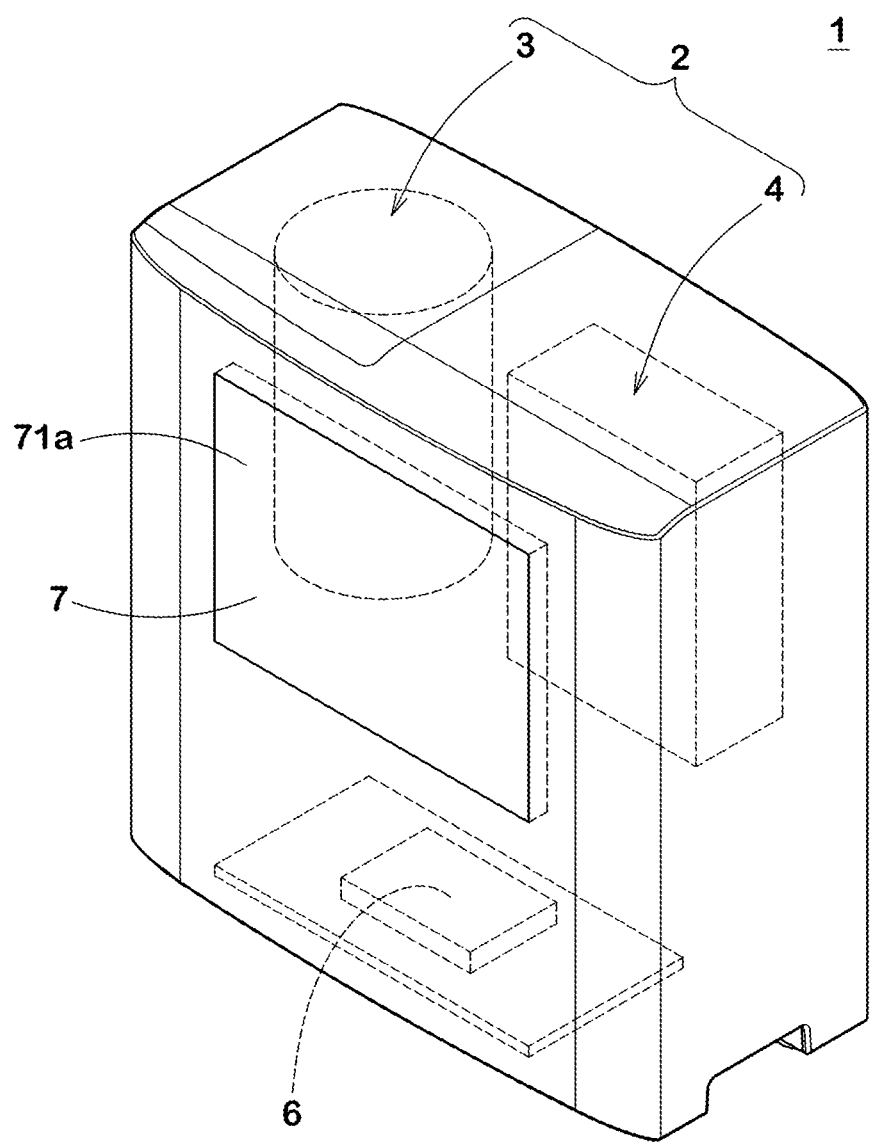
FIG. 1 is a perspective view illustrating a schematic configuration of a functional water production device according to an embodiment of the present invention.
Figure 2:
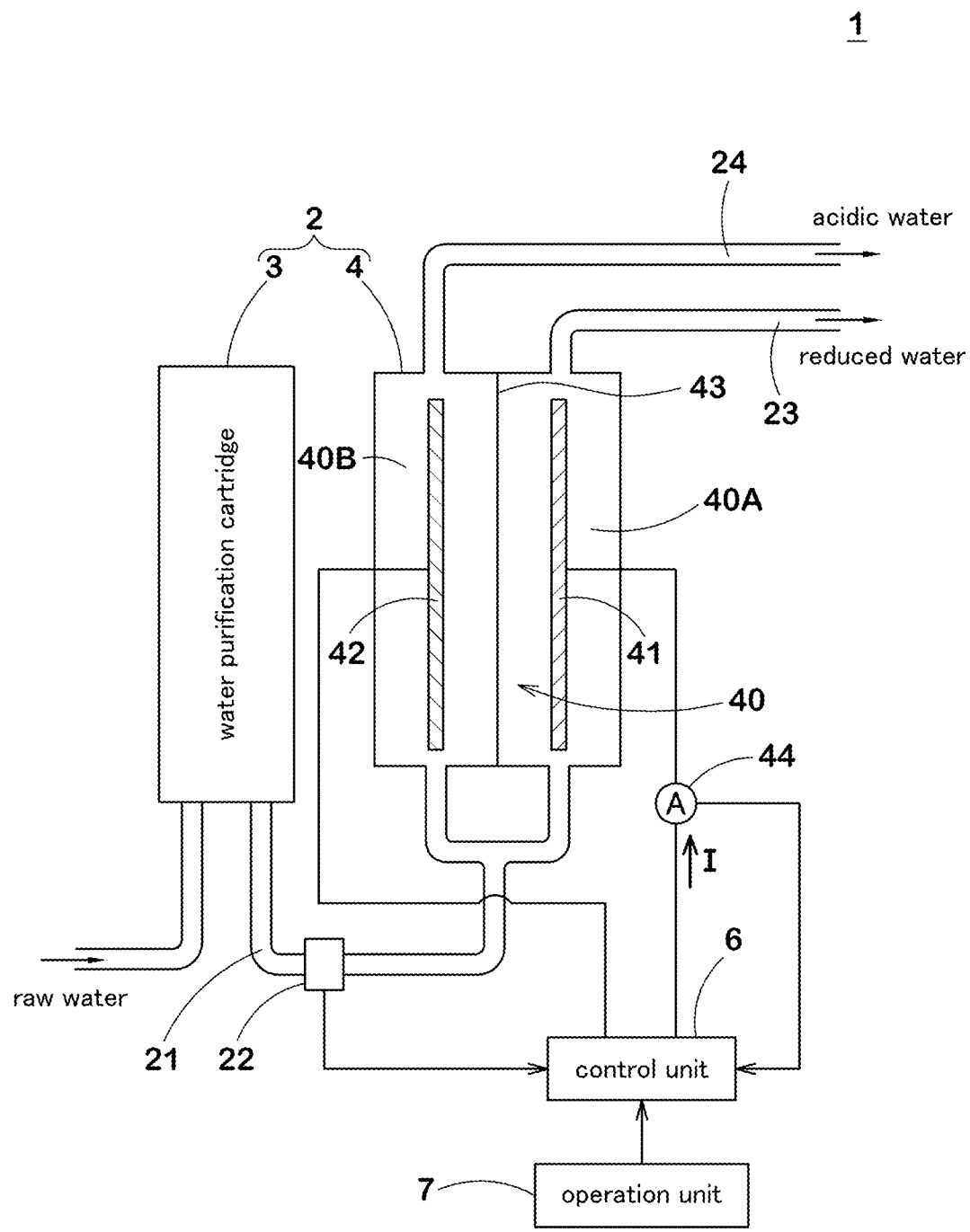
FIG. 2 is a block diagram showing a configuration of the functional water production device of FIG. 1.

FIG. 1 and FIG. 2 show a functional water production device 1 of the present embodiment.

The functional water production device 1 includes a functional water production unit 2 for producing functional water, a control unit 6 for controlling the functional water production unit 2, and an operation unit 7 for switching the operational mode of the functional water production unit 2.

The functional water produced by the functional water production unit 2 includes purified water which is purified, and reduced water or acidic water produced by electrolysis. That is, the operational modes of the functional water production unit 2 include a "water purification mode" for producing purified water, a "reduced water mode" for producing reduced water, and an "acidic water mode" for producing acidic water.

The functional water production unit 2 includes a water purification cartridge 3 for purifying raw water to produce purified water and an electrolytic cell 4 for producing reduced water or acidic water by electrolyzing the purified water passed through the water purification cartridge 3.

Generally, tap water is used as the raw water, but in addition, well water, groundwater, etc. can be used, for example.

The water purification cartridge 3 is configured to be attachable to and detachable from the main body of the functional water production device 1. The water purification cartridge 3 in this embodiment is provided upstream of the electrolytic cell 4. The water purification cartridge 3 may be provided downstream of the electrolytic cell 4. In this case, the water purification cartridge 3 purifies the reduced water and the acidic water produced by the electrolytic cell 4, or the raw water having passed through the electrolytic cell 4.

The electrolytic cell 4 electrolyzes the water supplied from the water purification cartridge 3 to produce reduced water and acidic water. The electrolytic cell 4 has an electrolytic chamber 40, a first power feeder 41, a second power feeder 42, and a diaphragm 43. The electrolytic chamber 40 is divided by the diaphragm 43 into a first electrode chamber 40A arranged on a side of the first power feeder 41 and a second electrode chamber 40B arranged on a side of the second power feeder 42.

The water purification cartridge 3 and the electrolytic cell 4 are connected by a water supply channel 21. The water supply channel 21 branches off in two directions at a branch portion on the way from the water purification cartridge 3 to the electrolytic cell 4 and is connected to the first electrode chamber 40A and the second electrode chamber 40B. Thereby, purified water purified by the water purification cartridge 3 is supplied to both the first electrode chamber 40A and the second electrode chamber 40B.

One of the first power feeder 41 and the second power feeder 42 is used as an anode power feeder and the other is used as a cathode power feeder. Polarities of the first power feeder 41 and the second power feeder 42 can be appropriately changed according to the operational mode and the like of the functional water production unit 2. Water is supplied to both of the first electrode chamber 40A and the second electrode chamber 40B of the electrolytic chamber 40 and a DC voltage is applied to the first power feeder 41 and the second power feeder 42, and then electrolysis of water occurs.

The diaphragm 43 is made of a polytetrafluoroethylene (PTFE) hydrophilic film, for example. In the electrolytic cell 4 configured as such, reduced water or acidic water is produced in the first electrode chamber 40A and the second electrode chamber 40B. Hydrogen gas generated by the electrolysis is dissolved in the reduced water, and oxygen gas generated by the electrolysis is dissolved in the acidic water. Thereby, the reduced water is also referred to as electrolytic hydrogen water.

The first electrode chamber 40A is connected to a first water discharge pipe 23, and the electrolytic water produced in the first electrode chamber 40A is discharged from the first water discharge pipe 23. On the other hand, the second electrode chamber 40B is connected to a second water discharge pipe 24, and the electrolytic water produced in the second electrode chamber 40B is discharged from the second water discharge pipe 24. In FIG. 2, the functional water production device 1 in the "reduced water mode" in which the reduced water produced in the first electrode chamber 40A is discharged from the first water discharge pipe 23 is shown.

The operation of the electrolytic cell 4 is controlled by the control unit 6. The control unit 6 includes a CPU (Central Processing unit) for executing various kinds of arithmetic processing, information processing, and the like, a memory for storing program for controlling the operation of the CPU and various kinds of information, and the like, for example.

When the operational mode of the functional water production unit 2 is the reduced water mode or the acidic water mode, the control unit 6 applies a DC voltage to the first power feeder 41 and the second power feeder 42. The control unit 6 controls the polarities of the first power feeder 41 and the second power feeder 42 according to the operational mode of the functional water production unit 2.

Further, the control unit 6 controls an electrolytic current (I) to be supplied to the first power feeder 41 and the second power feeder 42 according to the pH of the functional water. More specifically, the control unit 6 refers to the information stored in the memory based on a signal corresponding to a flow rate per unit time inputted from a flow rate sensor 22 provided in the water supply channel 21, and controls the electrolytic current (I) to be supplied to the power feeders 41 and 42. The control of the electrolytic current (I) is realized by controlling the DC voltage applied between the first power feeder 41 and the second power feeder 42 by the control unit 6. Thereby, electrolytic levels in the electrolytic cell 4 are controlled.

The operation unit 7 is operated by the user. The operation unit 7 is operated for switching the operational mode of the functional water production unit 2, for example.

Figure 3:
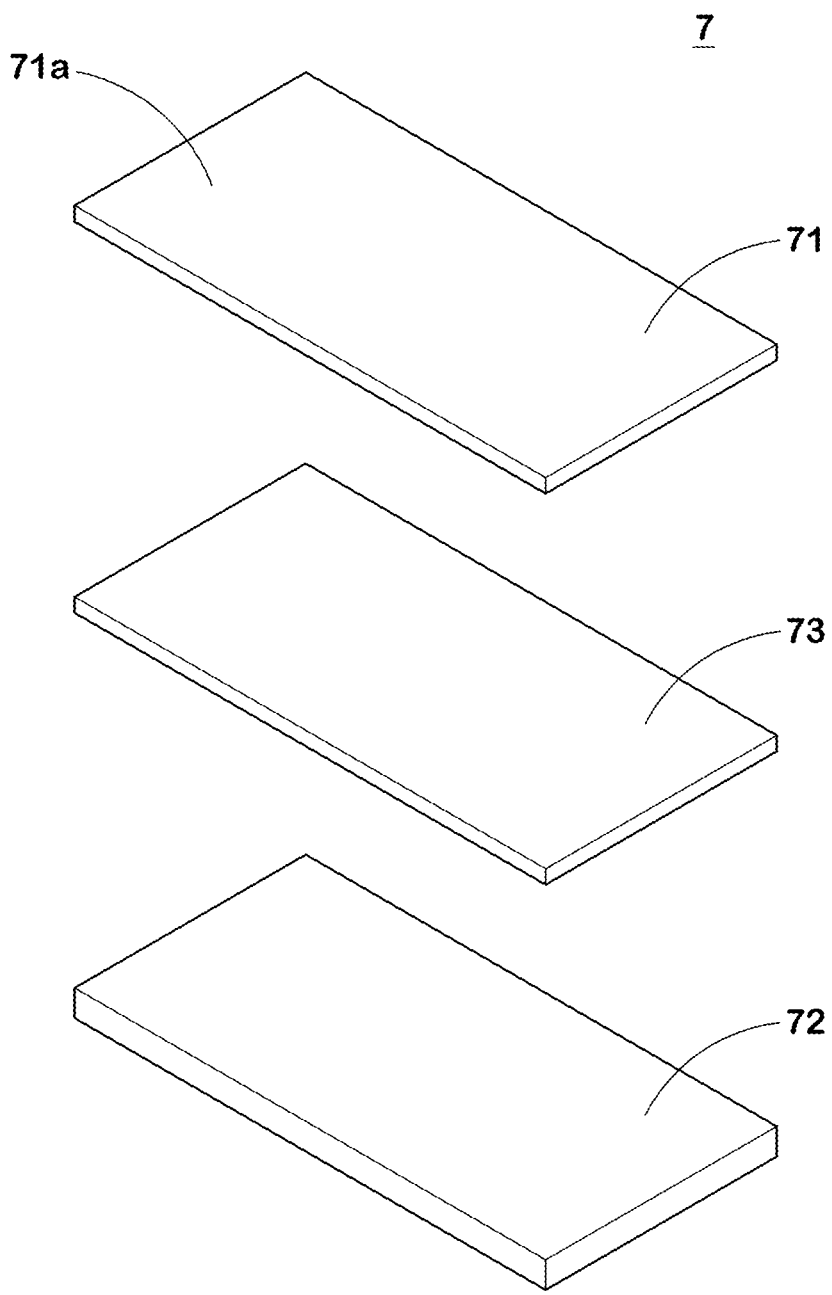
FIG. 3 is an exploded perspective view showing a configuration of an operation unit of FIG. 1.

FIG. 3 shows the configuration of the operation unit 7. The operation unit 7 has a front panel 71 arranged on a front surface thereof, a display unit 72 for displaying the operational areas on the front panel 71, and a position detecting unit 73 for detecting the position of the operation on an operational surface thereof. In this embodiment, a so-called projection type touch panel formed by stacking the front panel 71, the position detecting unit 73, the display unit 72, and the like is used.

For the front panel 71, a translucent plate member such as a glass plate is used, for example. The front panel 71 has an operational surface (71a) to be touched by the user for operation.

The display unit 72 is provided on the rear side of the position detecting unit 73. For the display unit 72, an LCD (Liquid Crystal Display) or the like is used, for example. The display unit 72 is controlled by the control unit 6 and projects various images on a side of the front panel 71. The control unit 6 refers to various kinds of information stored in the memory and controls the display unit 72. Therefore, the display unit 72 can display various kinds of information in various forms. For example, the display unit 72 can display the operational areas corresponding to the respective operational modes side by side on the operational surface (71a).

The images projected by the display unit 72 are perceived by the user through the position detecting unit 73 and the front panel 71. For this reason, the position detecting unit 73 is configured to be translucent.

The position detecting unit 73 detects a position on the operational surface (71a) touched by the user for operation and outputs the position information to the control unit 6. For example, when the operational surface (71a) is touch-operated while the display unit 72 displaying the operational areas corresponding to respective operational mode, the control unit 6 recognizes that an instruction to switch the operational mode of the functional water production unit 2 is inputted by the user. Then, the control unit 6 switches the operational mode of the functional water production unit 2 to the mode corresponding to the area operated by the user, and controls the electrolytic cell 4.

In this embodiment, the projection type display unit 72 is used, but a reflection type display unit (for example, a later-described sheet on which various kinds of information such as the operational areas is printed) may be used. In this case, the display unit is arranged on the front side or the rear side of the front panel 71, and the position detecting unit 73 having no translucency can be used. In a configuration in which the display unit is arranged on the front side of the front panel 71, the front panel 71 having no translucency can be used. By using the display unit configured as such, the configuration of the operation unit 7 is simplified, therefore, it is possible that the cost of the functional water production device 1 is decreased.

Figure 4:
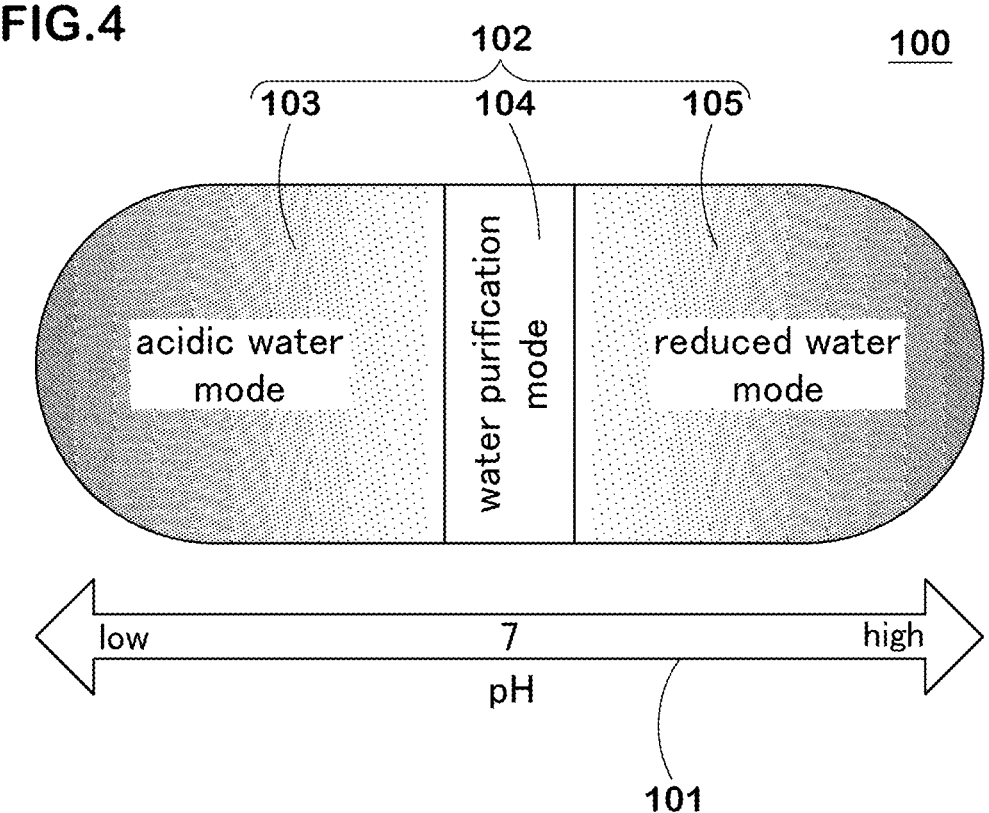
FIG. 4 shows an example of an image displayed on an operational surface of FIG. 3.

FIG. 4 shows an example of an image 100 displayed on the operational surface (71a). The image 100 includes a first coordinate axis 101 showing the pH of the functional water produced by the functional water production unit 2 and an operational area 102 for switching the operational mode of the functional water production unit 2.

The first coordinate axis 101 is displayed in a form extending in the horizontal direction or the vertical direction, for example. The first coordinate axis 101 configured as such makes it easier for the user to intuitively recognize the pH of the functional water, therefore, it improves usability of the functional water production device 1. Note that numerical values of pH may be indicated along with the first coordinate axis 101.

The operational area 102 in this embodiment is an area partitioned into an oval shape, and includes a first operational area 103 corresponding to the acidic water mode, a second operational area 104 corresponding to the water purification mode, and a third operational area 105 corresponding to the reduced water mode.

In this embodiment, the first operational area 103, the second operational area 104, and the third operational area 105 are displayed along the first coordinate axis 101 in the order of the pH of the functional water to be produced. That is, the first operational area 103 is displayed in a region corresponding to the pH less than 7 on the first coordinate axis 101, the second operational area 104 is displayed in the region corresponding to the pH 7 on the first coordinate axis 101, and the third operational area 105 is displayed in a region corresponding to the pH higher than 7 on the first coordinate axis 101.

When any one of the areas in the operational area 102 is touched by the user for operation, the position detecting unit 73 detects the operated position and outputs information of the position on the first coordinate axis to the control unit 6. Based on the position information outputted from the position detecting unit 73, the control unit 6 recognizes the type and the pH of the functional water selected by the user, that is, determines the type and the pH of the functional water to be produced, and controls the electrolytic cell 4 so that the desired functional water is produced. Thereby, the user can simply select the desired functional water and its pH by a single touch operation from the functional water that can be produced, therefore, the usability of the functional water production device 1 is improved.

Further, the display unit 72 displays the operational areas 103, 104, and 105 corresponding to the respective operational modes such that they are arranged along the first coordinate axis 101 on the operational surface (71a) in the order of the pH of the functional water to be produced. Thereby, the user can intuitively perceive the functional water and its pH according to the arrangement order, therefore, it is possible that the user intuitively selects the desired functional water and the desired pH of the water, thereby, the usability of the functional water production device 1 is improved.

In this embodiment, it is preferred that the display unit 72 displays the pH of the functional water in the first operational area 103 and the third operational area 105 by shades (contrast) of color. In the image 100 shown in FIG. 4, the pH of the functional water is represented by a gradation that changes continuously or stepwise. Thereby, the user can intuitively recognize the pH of the functional water in the first operational area 103 and the third operational area 105, therefore, the usability of the functional water production device 1 is improved.

The color for displaying the first operational area 103 and the color for displaying the third operational area 105 may be different from each other. In this case, the user can intuitively recognize the type and the pH of the functional water according to the color, therefore, the usability of the functional water production device 1 is further improved.

Further, the area touched by the user may be highlighted. In this case, the entire operational areas 103, 104, or 105 including the touched portion may be highlighted, or only the touched portion may be highlighted. This highlight display may be continued while discharging functional water.

Figure 5:
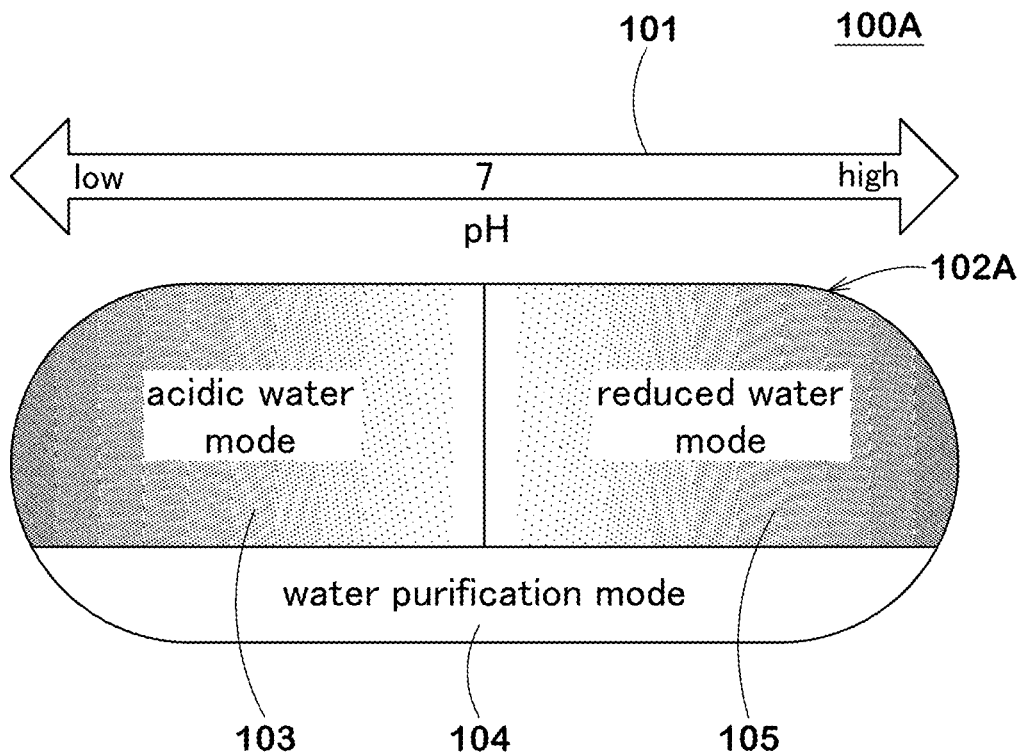
FIG. 5 shows a modification of the image of FIG. 4.
Figure 6:
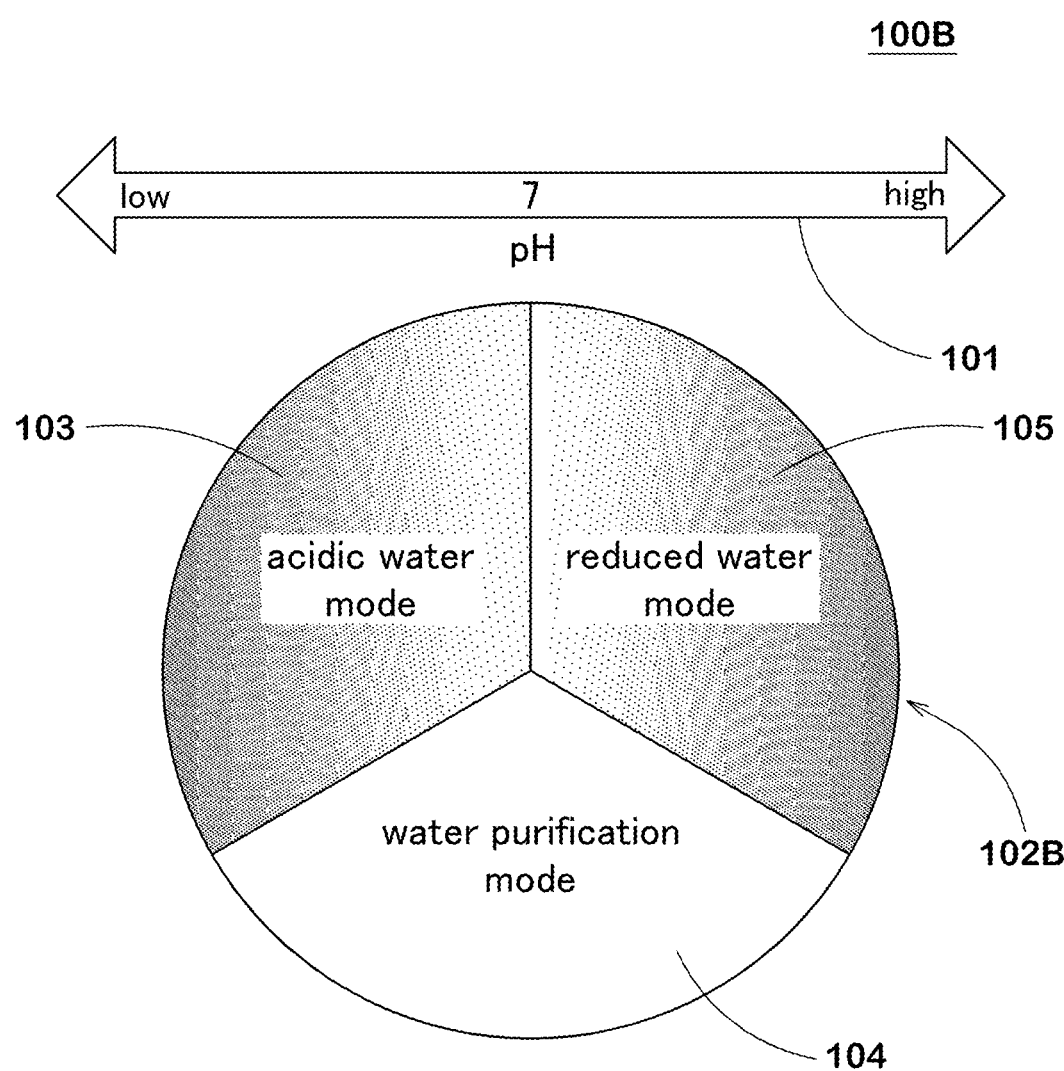
FIG. 6 shows another modification of the image of FIG. 4.

FIGS. 5 and 6 respectively show images 100A and 100B which are modifications of the image 100 displayed on the operational surface (71a). For the configuration not described below regarding the images 100A and 100B, the configuration of the image 100 can be appropriately applied.

In the image 100A, the operational area 102A is partitioned into an oval shape, and the first operational area 103 corresponding to the acidic water mode and the third operational area 105 corresponding to the reduced water mode are arranged along the first coordinate axis 101 in the order of the pH of the produced functional water. The second operational area 104 corresponding to the water purification mode is displayed below the first operational area 103 and the third operational area 105.

In the image 100B, the operational area 102B is partitioned into a circular shape, and the first operational area 103 corresponding to the acidic water mode, the second operational area 104 corresponding to the water purification mode, and the third operational area 105 corresponding to the reduced water mode are each sectioned in a fan-like shape. As is the case with the image 100A, the first operational area 103 and the third operational area 105 are displayed side by side along the first coordinate axis 101 in the order of the pH of the produced functional water, and the second operational area 104 is displayed below the first operational area 103 and the third operational area 105.

In the image 100A or 100B shown in FIGS. 5 and 6, it is possible that the second operational area 104 corresponding to the water purification mode is displayed in a wide area, therefore, operability of the operation unit 7 is improved.

A solid polymer electrolyte membrane made of a fluorine-based resin material having a sulfonate group may be used as the diaphragm 43, for example. The functional water produced by electrolysis in the electrolytic cell 4 configured as such is neutral, and in the first electrode chamber 40A and the second electrode chamber 40B, neutral hydrogen water in which hydrogen is dissolved or neutral oxygen water in which oxygen is dissolved is produced. The dissolved hydrogen concentration of the hydrogen water or the dissolved oxygen concentration of the oxygen water produced in the electrolytic cell 4 depends on the electrolytic level in the electrolytic cell 4, that is, the electrolytic current (I).

Figure 7:
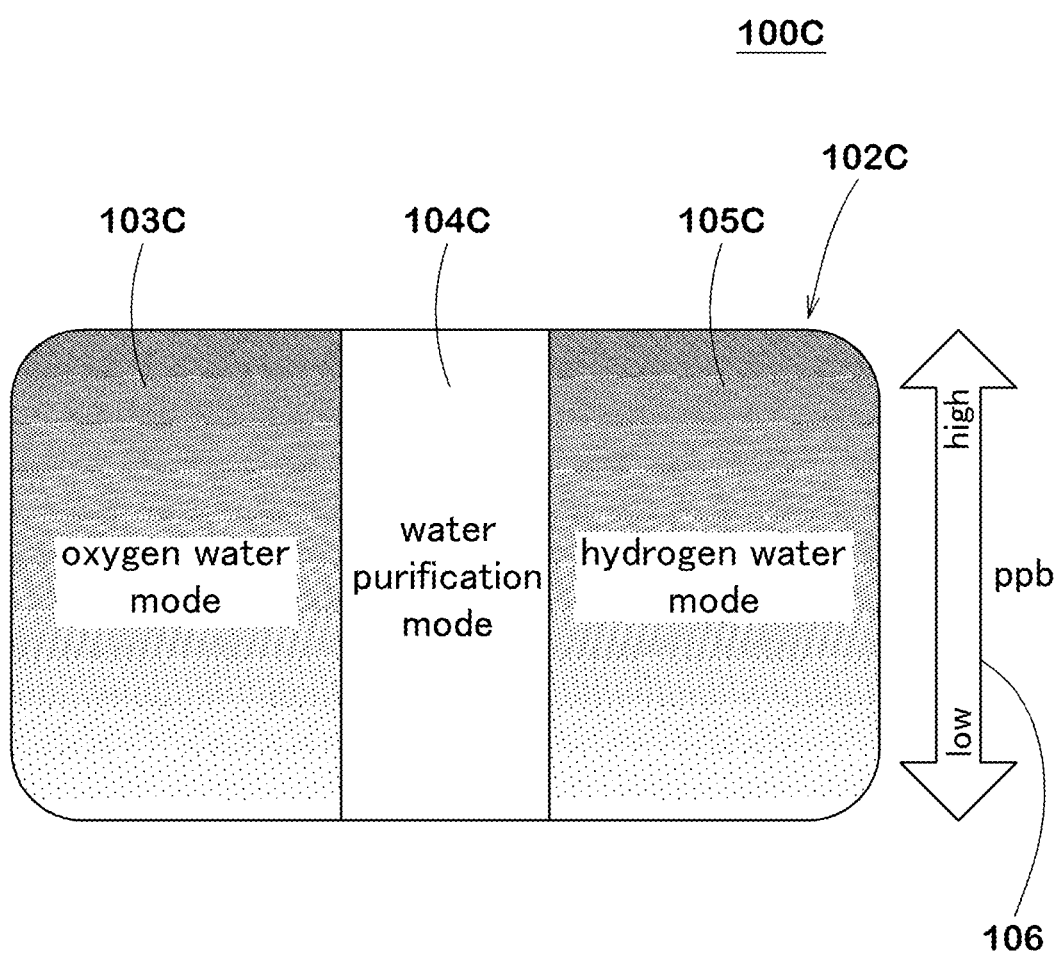
FIG. 7 shows yet another modification of the image of FIG. 4.

FIG. 7 shows an image 100C displayed on the operational surface (71a) of the functional water production device 1 in which the solid polymer electrolyte membrane is used as the diaphragm 43. For the configuration not described below regarding the image 100C, the configuration of the image 100A or 100B can be appropriately applied.

In the image 100C, a second coordinate axis 106 indicating dissolved gas concentration of the functional water is displayed instead of the first coordinate axis 101 of the image 100. The second coordinate axis 106 extends in the vertical direction or the horizontal direction. The second coordinate axis 106 configured as such makes it easy for the user to intuitively recognize the dissolved gas concentration of the functional water, therefore, the usability of the functional water production device 1 is improved.

In the operational area 102C of the image 100C, in accordance with the first operational area 103, the second operational area 104, and the third operational area 105 of FIG. 4, a first operational area 103C corresponding to an oxygen water mode, a second operational area 104C corresponding to the water purification mode, and a third operational area 105C corresponding to a hydrogen water mode are displayed side by side in the horizontal direction.

When any one of the areas in the operational area 102C is touched by the user for operation, the position detecting unit 73 detects the operated position and outputs the information of the position on the first coordinate axis and the second coordinate axis to the control unit 6. Based on the position information outputted from the position detecting unit 73, the control unit 6 determines the type of the functional water and the dissolved gas concentration selected by the user, that is, determines the type of the functional water and the dissolved gas concentration to be produced, and controls the electrolytic cell 4 so as to produce the desired functional water. Thereby, the user can simply select the type of the functional water and the dissolved gas concentration by a single touch operation, therefore, the usability of the functional water production device 1 is improved.

Figure 8:
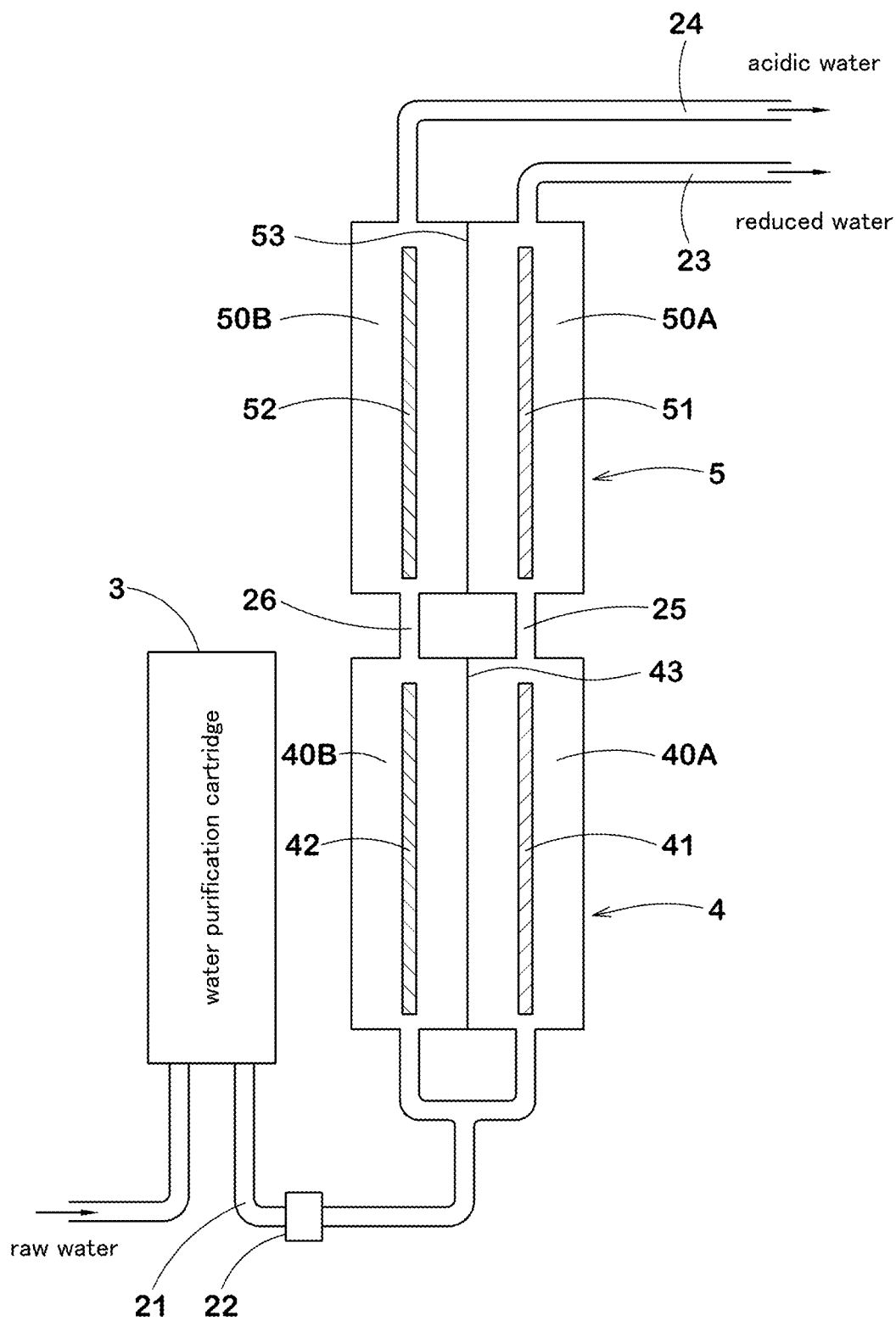
FIG. 8 is a block diagram showing a configuration of a modification of a functional water production unit of FIG. 2.

FIG. 8 shows a functional water production unit 2A which is a modification of the functional water production unit 2. For the configuration not described below regarding the functional water production unit 2A, the configuration of the functional water production unit 2 can be appropriately applied.

The functional water production unit 2A includes the water purification cartridge 3 and a pair of the electrolytic cell 4 and an electrolytic cell 5. The electrolytic cell 4 and the electrolytic cell 5 are connected in series.

The configuration of the electrolytic cell 5 arranged on the downstream side is equivalent to that of the electrolytic cell 4. That is, the electrolytic cell 5 has an electrolytic chamber 50, a first power feeder 51, a second power feeder 52, and a diaphragm 53. The electrolytic chamber 50 is divided by the diaphragm 53 into a first electrode chamber 50A arranged on a side of the first power feeder 51 and a second electrode chamber 50B on a side of the second power feeder 52. The first electrode chamber 40A of the electrolytic cell 4 and the first electrode chamber 50A of the electrolytic cell 5 are connected by a connecting pipe 25. The second electrode chamber 40B of the electrolytic cell 4 and the second electrode chamber 50B of the electrolytic cell 5 are connected by a connecting pipe 26. The electrolytic chamber 50 is controlled by the control unit 6. That is, the electrolytic level in the electrolytic cell 5, that is, the electrolytic current is controlled by the control unit 6.

In the functional water production unit 2A, one of the diaphragms 43 and 53 is made of a polytetrafluoroethylene (PTFE) hydrophilic film and the other is made of a solid polymer electrolyte membrane made of a fluorine-based resin material having a sulfonate group. According to the functional water production unit 2A, the dissolved gas concentration of the functional water is increased by the electrolytic cell having the other diaphragm. Thereby, it is possible to further increase the dissolved gas concentration while maintaining the pH of the functional water as the same level as the functional water production unit 2. In other words, in the functional water production unit 2A, the dissolved gas concentration of the functional water can be set independently of the pH.

Figure 9:
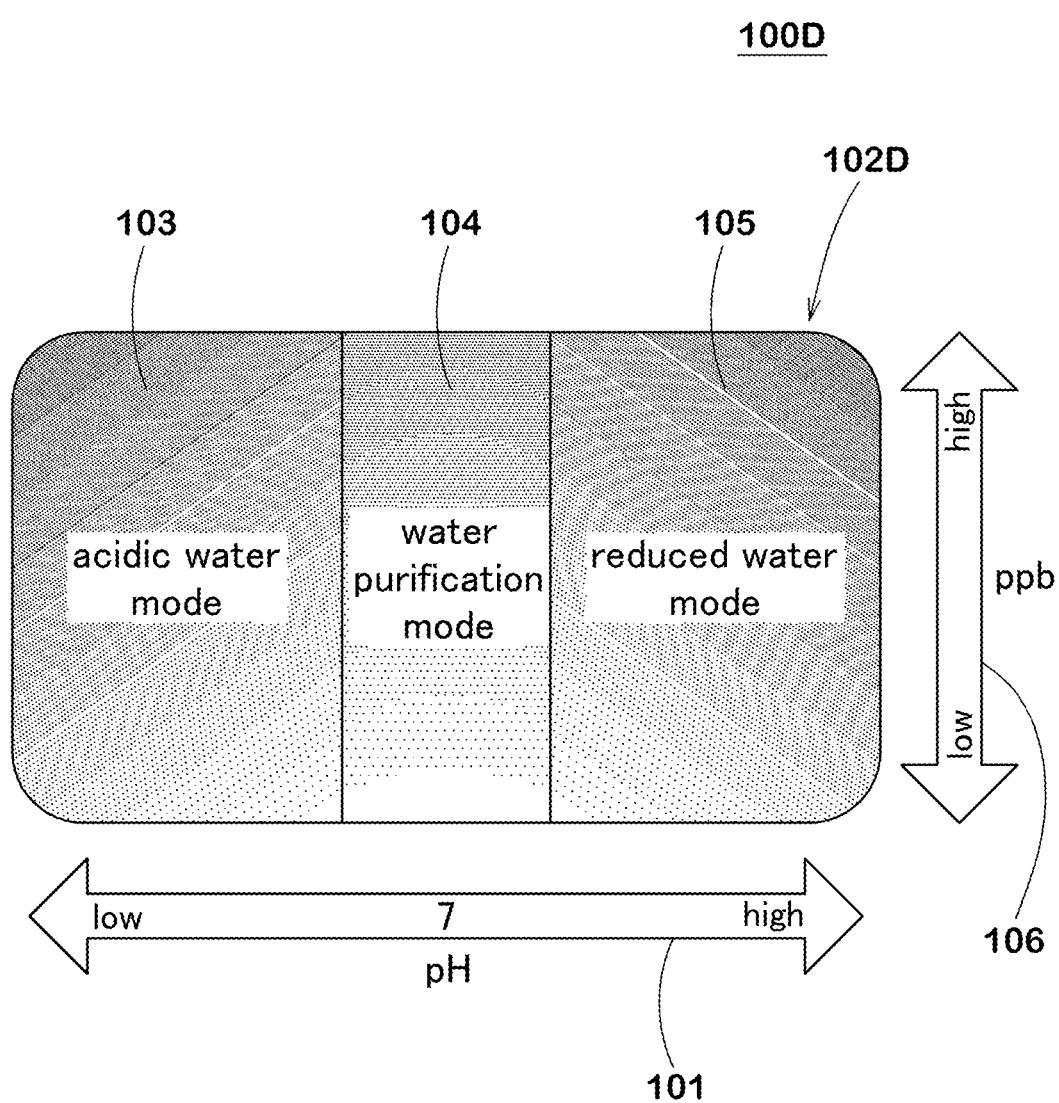
FIG. 9 shows an example of the image displayed on the operational surface of the operation unit of the functional water production device having the functional water production unit of FIG. 8.

FIG. 9 shows an image 100D displayed on the operational surface (71a) of the functional water production device 1 provided with the functional water production unit 2A. For the configuration not described below regarding the image 100D, the configurations of the images 100 to 100C can be appropriately applied.

In the image 100D, in addition to the first coordinate axis 101 of the image 100, the second coordinate axis 106 indicating the dissolved gas concentration of the functional water is displayed.

When any one of the areas in an operational area 102D is touched by the user for operation, the position detecting unit 73 detects the operated position and outputs information of the position on the first coordinate axis and the second coordinate axis to the control unit 6. Based on the position information outputted from the position detecting unit 73, the control unit 6 recognizes the type of the functional water, the pH, and the dissolved gas concentration selected by the user, that is, determines the type, the pH, and the dissolved gas concentration of the functional water to be produced, and controls the electrolytic cell 4 so that desired functional water is produced. Thereby, the user can simply select the type, the pH, and the dissolved gas concentration of the functional water by a single touch operation, therefore, the usability of the functional water production device 1 is improved.

While detailed description has been made of the functional water production device 1 of the present invention, the present invention can be embodied in various forms without being limited to the illustrated embodiments.
That is, it suffices as long as the functional water production device 1 is configured such that it comprises the functional water production unit 2 for producing the functional water including the purified water that is purified, the reduced water or the acidic water, the control unit 6 for controlling the functional water production unit 2 in a plurality of the operational modes including the water purification mode for producing the purified water, the reduced water mode for producing the reduced water, and the acidic water mode for producing the acidic water, and the operation unit 7 for switching the operational modes, and the operation unit 7 comprises the operational surface (71a) to be touched by a user for operation, the display unit 72 for displaying the operational areas 103, 104, and 105 respectively corresponding to the operational modes along the first coordinate axis 101 on the operational surface (71a) in the order of the pH of the functional water to be produced, and the position detecting unit 73 for detecting the position of the touch for the operation on the operational surface (71a) by the user and outputting the information of the position to the control unit 6, and the control unit 6 determines the operational mode and the pH of the functional water to be produced in the determined operational mode based on the information of the position and controls the functional water production unit 2.

REFERENCE SIGNS LIST 1 functional water production device
2 functional water production unit
6 control unit
7 operation unit
71a operational surface
72 display unit
73 position detecting unit

The invention claimed is:
1. A functional water production device comprising:
a functional water production unit for producing functional water including purified water, reduced water or acidic water;
a control unit for controlling the functional water production unit in a plurality of operational modes including a water purification mode for producing the purified water, a reduced water mode for producing the reduced water, and an acidic water mode for producing the acidic water; and
an operation unit for switching the operational modes, wherein the operation unit comprises
a touch panel including an operational surface that is to be physically touched by a user for operation,
a display unit for displaying operational areas respectively corresponding to the operational modes along a first coordinate axis on the operational surface in an order of pH of the functional water to be produced, wherein an operational area of the reduced water mode and an operational area of the acidic water mode have respective regions extending in the first coordinate axis, and
a position detecting unit for detecting a position of the touch for operation at which the user makes a contact on the operational surface by a single touch operation wherein the position of the touch is referred on the first coordinate axis, and outputting information of the position to the control unit, and
the control unit determines the operational mode, which is selected between the reduced water mode and the acidic water mode, and the pH of the functional water to be produced in the determined operational mode based on the information of the position. which was detected only with the single touch operation by the user, and controls the functional water production unit such that the pH of the reduced water and the pH of the acidic water to be produced vary according to the position of the touch on the first coordinate axis,
the first coordinate axis is a straight pH bar having two ends, one end indicating the lowest pH and the other end indicating highest pH, and the middle therebetween indicating pH 7,
the operational areas corresponding to the respective operational modes are composed with the acidic water mode, the water purification mode and the reduced water mode,
the operational areas for the acidic water mode, the water purification mode and the reduced water mode are linearly and continuously arranged side by side, which are parallel to the first coordinate axis, in this order on the operational surface, wherein there is no coordinate axis referring to pH of the functional water other than the first coordinate axis (101) on the operational surface, and the operational area for the acidic water mode faces the lowest pH end, the operational area for the water purification mode faces the middle of the pH bar, the operational area for the reduce water mode faces the highest end.

2. The functional water production device according to claim 1, wherein the display unit displays the pH of the functional water by shades of color.

3. The functional water production device according to claim 1, wherein the functional water production unit includes an electrolytic cell having a first electrode chamber and a second electrode chamber divided by a solid polymer membrane.

4. The functional water production device according to claim 3, wherein the control unit determines dissolved gas concentration of the functional water based on the information of the position and controls the functional water production unit.

5. The functional water production device according to claim 4, wherein the display unit displays the dissolved gas concentration on a second coordinate axis on the operational surface.

6. The functional water production device according to claim 2, wherein the functional water production unit includes an electrolytic cell having a first electrode chamber and a second electrode chamber divided by a solid polymer membrane.

7. The functional water production device according to claim 6, wherein the control unit determines dissolved gas concentration of the functional water based on the information of the position and controls the functional water production unit.

8. The functional water production device according to claim 7, wherein the display unit displays the dissolved gas concentration on a second coordinate axis on the operational surface.

9. The functional water production device according to claim 1, wherein an image which corresponds to the first coordinate axis for showing the pH of the functional water is displayed on the operational surface.

10. The functional water production device according to claim 1, wherein the operational areas comprise a first operational area corresponding to the acidic water mode and a third operational area corresponding to the reduced water mode, and the display unit displays the pH of the functional water in the first operational area and the third operational area by shades of color.

11. The functional water production device according to claim 10, wherein the pH of the functional water in the first operational area and the third operational area is represented by a gradation that changes continuously or stepwise.

12. The functional water production device according to claim 1, wherein the entire operational area touched by the user is highlighted.

13. The functional water production device according to claim 1, wherein only a touched portion by the user on one of the operational areas is highlighted.

14. The functional water production device according to claim 3, wherein the display unit further displays dissolved gas concentration on a second coordinate axis on the operational surface, the operational area of the reduced water mode and the operational area of acidic water mode have respective regions extending in a second coordinate axis perpendicular to the first coordinate axis, the position detecting unit further detects a position on the second coordinate axis of the touch for operation on the operational surface by the user and outputting information of the position on the second coordinate axis to the control unit, and the control unit determines the dissolved gas concentration of the functional water based on the information of the position on the second coordinate axis and controls the functional water production unit such that the dissolved gas concentration of the reduced water and the dissolved gas concentration of the acidic water to be produced vary according to the position on the second coordinate axis of the touch for operation on the operational surface by the user.

* * * * *